(12) United States Patent
Stoffels et al.

(10) Patent No.: US 6,857,695 B2
(45) Date of Patent: Feb. 22, 2005

(54) BODY FOR A MOTOR VEHICLE

(75) Inventors: Oliver Stoffels, Ludwigsburg (DE); André Scholz, Wiernsheim (DE); Thomas Meier, Rheinstetten (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/715,858

(22) Filed: Nov. 19, 2003

(65) Prior Publication Data

US 2004/0160091 A1 Aug. 19, 2004

(30) Foreign Application Priority Data

Nov. 20, 2002 (DE) .......................................... 102 54 133

(51) Int. Cl.$^7$ ................................................. B60J 7/11
(52) U.S. Cl. ..................................... 296/218; 280/756
(58) Field of Search .............................. 296/218, 224, 296/901.01, 181.2, 181.6

(56) References Cited

U.S. PATENT DOCUMENTS

| | | | |
|---|---|---|---|
| 3,476,437 A | | 11/1969 | Schroeder et al. |
| 3,728,537 A | * | 4/1973 | Barenyi et al. ............. 362/493 |
| 3,794,376 A | * | 2/1974 | Barenyi et al. ............. 296/210 |
| 4,767,154 A | | 8/1988 | Okamoto et al. |
| 4,852,938 A | | 8/1989 | Hirshberg et al. |
| 5,489,134 A | | 2/1996 | Furuki et al. |
| 6,257,650 B1 | | 7/2001 | Lee et al. |
| 6,296,295 B1 | | 10/2001 | Jambor et al. ......... 296/146.14 |

FOREIGN PATENT DOCUMENTS

| | | | |
|---|---|---|---|
| DE | 4116223 A1 | 11/1992 | |
| DE | 19752068 | 5/1999 | |
| DE | 19825651 | 10/2001 | |
| EP | 0454279 A2 | 10/1991 | |
| FR | 1136094 | * 5/1957 | ................ 296/210 |
| JP | 03128726 A | 5/1991 | |

OTHER PUBLICATIONS

AUTOFOCUS, No. 5/02, Sept./Oct. 2002, Cover and p. 33. (2 pages).

* cited by examiner

*Primary Examiner*—Dennis H. Pedder
(74) *Attorney, Agent, or Firm*—Crowell & Moring LLP

(57) ABSTRACT

A body of a motor vehicle, particularly a passenger car of the sports car type, equipped with a windshield frame, a rollover bar system and a removable roof covering an area between the windshield frame and the rollover bar system. The roof on one side follows a convex shaping course of the windshield frame and, on the other side, follows a shaping course of the rollover bar system such that, viewed in the longitudinal direction of the passenger car, the roof has two lateral roof sections and a center roof section which extends between the lateral roof sections in the manner of a crease-type indentation shaped in the direction of the vehicle occupant compartment.

28 Claims, 3 Drawing Sheets

BODY FOR A MOTOR VEHICLE

This application claims the priority of German application 102 54 133.7, filed Nov. 20, 2002, the disclosure of which is expressly incorporated by reference herein.

BACKGROUND AND SUMMARY OF THE INVENTION

The invention relates to a body for a motor vehicle, particularly a passenger car of the sports car type, according to the preamble of Claim 1 having a removable roof and a rollbar system.

A body of a passenger car known from German Patent Document DE 197 52 068 is equipped with a windshield frame and a rollover bar system which has two individual rollover bars which extend transversely to the longitudinal direction of the vehicle and are arranged at a distance from one another. A roof covers an area from the windshield frame to the rollover bar system, the roof being movable from a closed position into a lowered position and vice-versa.

German Patent Document DE 198 25 651 C2 discloses a motor vehicle with an openable top, in the case of which a protective wall of glass is provided between the seats and a rollover bar arrangement mounted on a vehicle body. The top comprises a roof which covers a vehicle occupant compartment of the motor vehicle from the direction of a windshield and can be moved from a covering position into an open position and vice-versa.

From German Publication DE-AUTOFOCUS, September/October 2002, Page 33, a sports car of a coupe type is known whose roof comprises two lateral convex curvatures extending in the longitudinal direction of the vehicle, between which a concave indentation extends. This roof construction is called a double bubble (=double dome).

It is an object of the invention to provide a body of a passenger car having a windshield frame, a rigid rollover bar system and a removable roof which follows defined shape definitions of the windshield frame as well as of the rollover bar system and, while the roof height is relatively low, along a longitudinal center plane in the lateral areas, offers an acceptable headroom to the occupants.

However, in this case, the roof should also have a high stability and a low weight.

According to the invention, this object is achieved by a body for a motor vehicle having a windshield frame, a rollover bar system and a dimensionally stable removable roof which covers an area between the windshield frame and the rollover bar system, the roof on one side following a convex shaping course of the windshield frame and, on the other side, following a shaping course of the rollover bar system, therefore defining a shaped structure such that, viewed in the longitudinal direction of the vehicle, the roof has two lateral roof sections and a center roof section which extends between the lateral roof sections in the manner of a crease-type indentation means of the characteristics of Claim 1. Additional characteristics further developing the invention are contained in the subclaims. Additional embodiments will be apparent from the following descriptions.

The principal advantages achieved by means of the invention are that the vehicle body has a removable roof which spans a vehicle occupant compartment between a windshield frame and a rollover bar system and which is adapted to the defined, mutually deviating dimensions of the vehicle frame and of the rollover bar system which not only facilitates the largely free design of the latter but also has a particularly aesthetic effect as a result of the exterior shape of the roof. This is promoted in that, in the cross-sectional view of the roof, in a center area between the windshield frame and the rollover system, lateral roof sections are constructed as curvatures and the center roof section is constructed as a plane situated in-between. As a result of the lateral roof sections or curvatures, the vehicle occupants' headroom can also be optimized in the case of a passenger car of the sports car category. The rollover system comprises individual rollover bars which, for achieving a targeted stability, are supported on mutually facing legs by means of a cross member, in which case, the center roof section extends along this cross member, and the lateral roof sections of the roof extend over partial areas of the individual rollover bars, whereby a constructional compactness of the vehicle body is achieved. Finally, viewing panes made of glass can be inserted in a simple manner into openings bounding the individual rollover bars or the cross members as well as the body walls.

The drawing illustrates an embodiment of the invention which will be explained in detail in the following. Other objects, advantages and novel features of the present invention will become apparent from the following detailed description of the invention when considered in conjunction with the accompanying drawings.

DETAILED DESCRIPTION

Figure 1:
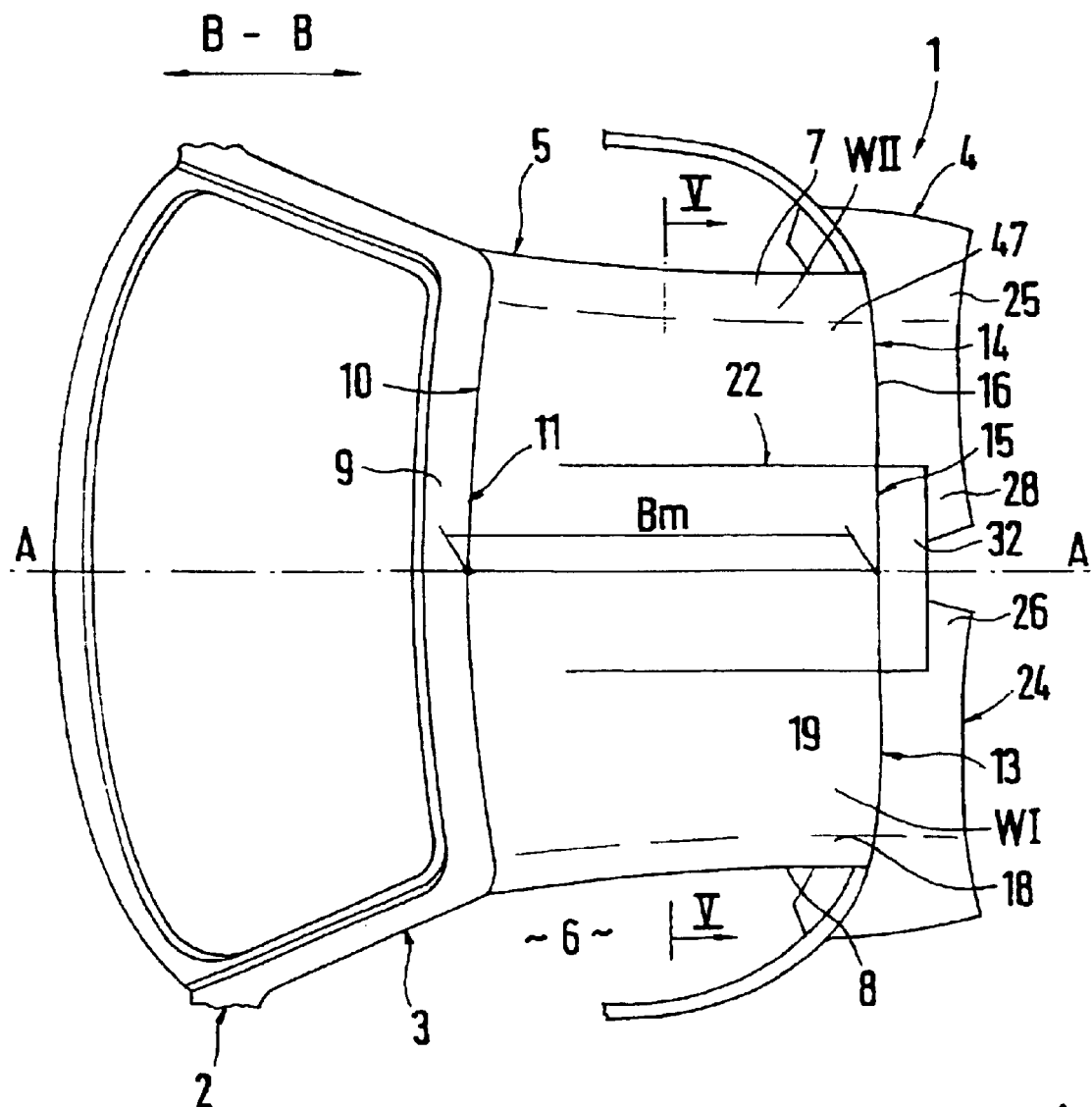
FIG. 1 is a top view of a passenger car with the vehicle body according to an embodiment of the invention.
Figure 2:
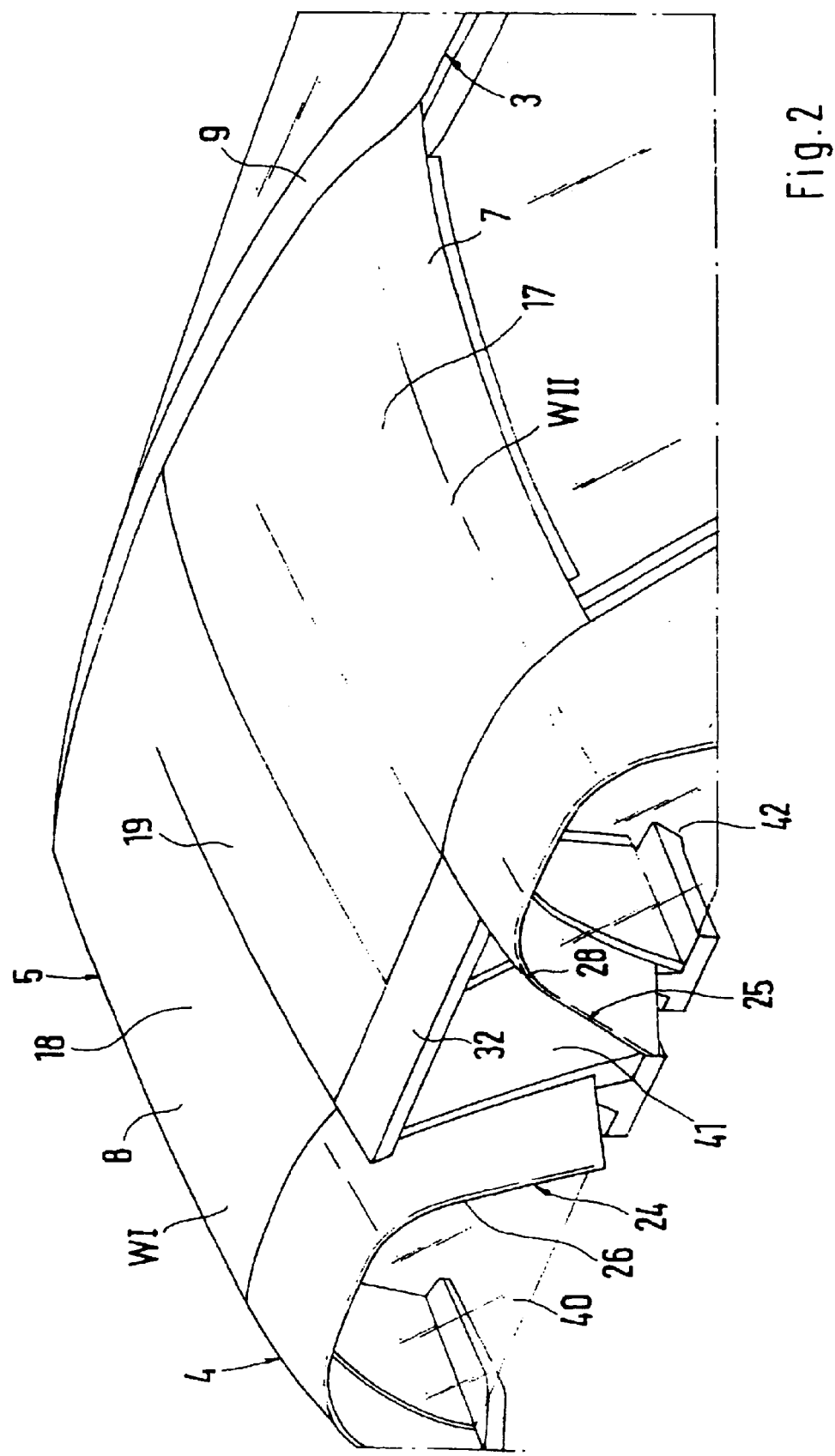
FIG. 2 is a diagonal an oblique view of the passenger car of FIG. 1 from the left front.

A passenger car 1 of the sports car type comprises a vehicle body 2 having a windshield frame 3 and a rollover bar system 4. A removable roof 5 covers a vehicle occupant compartment 6 and is held in position on the windshield frame 3 and on the rollover bar system 4 by means of suitable fastening devices. The roof 5, which can be accommodated in a storage space—not shown—of the passenger car 1, consists of two roof elements 7 and 8 fitted together in a longitudinal center plane A—A of the passenger car 1, in which case each dimensionally stable roof element consists, for example, of a light-weight but high-strength material, for example, a glass-fiber-reinforced plastic material.

Figure 3:
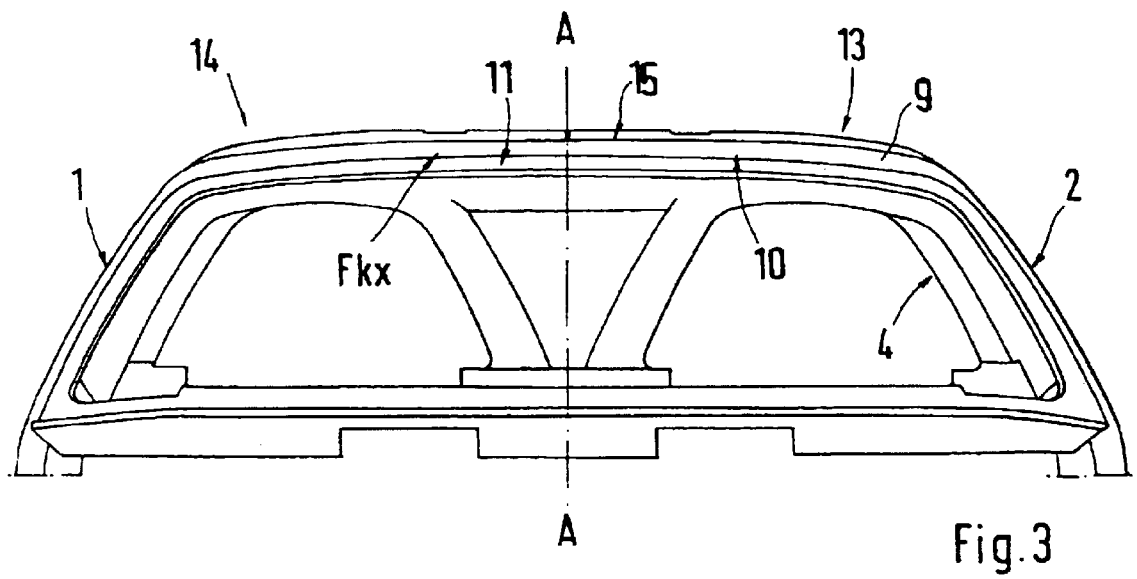
FIG. 3 is a frontal view of the passenger car of FIG. 1.

The windshield frame 3 is provided with a transverse frame 9 facing the roof 5 which, in a frontal view of the passenger car—shown in FIG. 3,—has a dimensional line 10 of a convex shape Fkx which is followed by a forward roof line 11 of the roof 5. Adjacent to the roof 5, the rollover bar system 4 has a transverse part 12 which—in a rear view of the passenger car—shown in FIG. 4—has two outer convexly shaped sections 13 and 14 as well as a central concavely shaped section 15, which shaped sections 13, 14 and 15 form a shaping course Fkx/kv. A rearward roof line 16 of the roof 5 is adapted to this shaping course Fkx/kv. Viewed in the longitudinal direction B—B of the vehicle, the roof 5 has two lateral roof sections 17 and 18 and a center roof section 19 which, in the manner of a crease-type indentation 20 shaped in the direction of the vehicle occupant compartment 6, extends between the lateral roof sections 17 and 18. The indentation 20 has a depth 21 which uniformly increases from the rollover bar system 4 in the driving direction.

Figure 5:
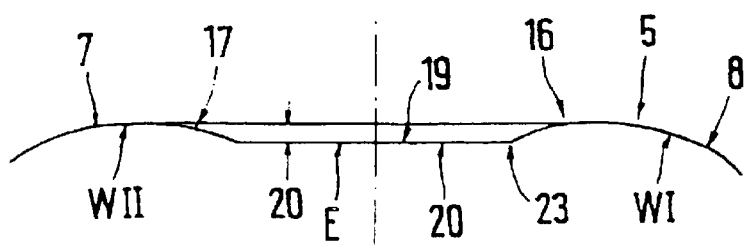
FIG. 5 is a sectional view along Line V—V of FIG. 1.

According to the cross-sectional view of the roof 5 of FIG. 5, the lateral roof sections 17 and 18 are constructed as curvatures WI and WII in an area Bm—(shown in FIG. 1)—between the windshield frame 3 and the rollover bar system 4. In contrast, the center roof section 19 is illustrated as a plane E, in which case, in the top view of the roof 5—FIG. 1—visible contour lines 22 and 23 are provided between the lateral roof sections 17 and 18 and the center roof section 19 respectively, which contour lines 22 and 23 extend in the longitudinal direct B—B of the vehicle. In the this embodiment, the contour lines 22 and 23 are aligned parallel to the longitudinal center plane A—A. However, another course of the contour lines 22 and 23 with respect to one another is also conceivable, for example, a conical course.

Figure 4:
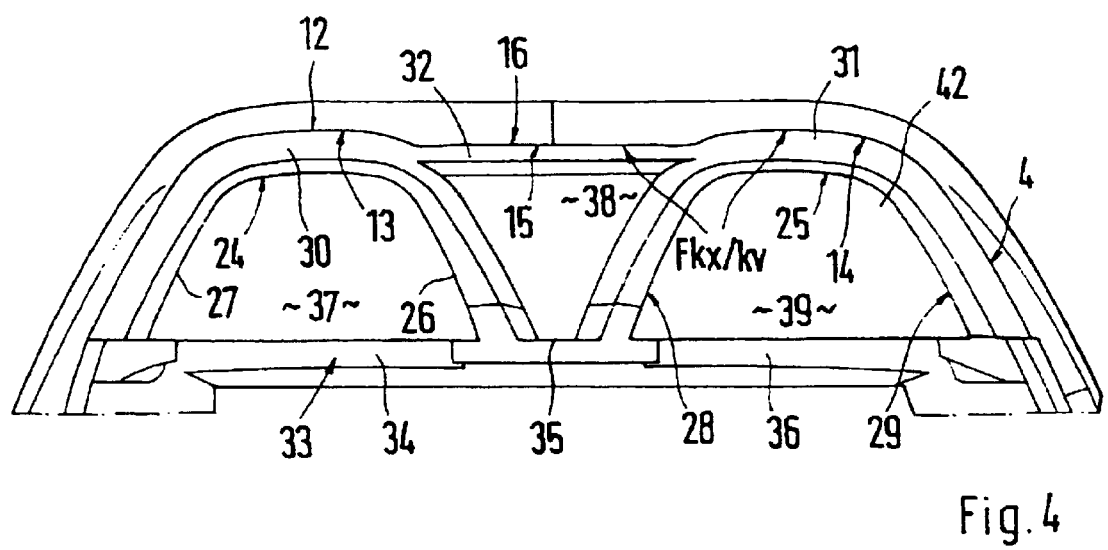
FIG. 4 is a rear view of the passenger car of FIG. 1.

The rollover bar system 4 comprises two individual rollover bars 24 and 25 which are arranged in a mutually spaced manner transversely to the longitudinal direction B—B of the vehicle, which individual rollover bars 24 and 25 have upright legs 26 and 27, 28 and 29—as shown in FIG. 4—. The legs 26 and 27 as well as 28 and 29, which extend conically in the direction of the vehicle body 2, lead into arc-type webs 30 and 31. The mutually facing legs 26 and 28 are supported by means of a horizontally aligned cross member 32 of the rollover bar system 4, on which the center roof section 19 rests. The individual rollover bars 24 and 25 as well as the cross member 32 consist of a high-strength material, such as a carbon-fiber-reinforced plastic material—CFK—, and are integrated in a vehicle body structure 33 made of the same material or plastic material. Finally, the individual rollover bars 24 and 25, the cross members 32 and the vehicle body walls 34, 35 and 36 bound trapezoidal openings 37, 38 and 39 into which the viewing panes 40, 41 and 42 made of glass are inserted.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Body for a motor vehicle, having a windshield frame, a rollover bar system and a dimensionally stable removable roof which covers an area between the windshield frame and the rollover bar system, wherein the roof, on the one side, follows a convex shaping course of the windshield frame and, on the other side, follows a shaping course of the rollover bar system, which shaping course includes convexly shaped sections and a concavely shaped section and defines a shaped structure such that, viewed in the longitudinal direction of the passenger car, the roof, at least in areas, has two lateral roof sections and a center roof section which extends between the lateral roof sections in the manner of a crease-type indentation shaped in the direction of the vehicle occupant compartment.

2. Body according to claim 1, wherein, in a cross-sectional view of the roof, the lateral roof sections between the windshield frame and the rollover bar system are constructed as curvatures, and the center roof section is constructed as a plane situated in-between.

3. Body according to claim 2, wherein, in the top view of the roof, visible contour lines extending in the longitudinal direction of the vehicle are provided between the lateral roof sections and the center roof section.

4. Body according to claim 1, wherein the indentation increases continuously between the windshield frame and the rollover bar system.

5. Body according to claim 2, wherein the indentation increases continuously between the windshield frame and the rollover bar system.

6. Body according to claim 1, wherein the rollover bar system has two individual rollover bars which are spaced in the transverse direction of the vehicle and have upright legs, mutually facing legs of the individual rollover bars are supported by means of a cross member, and the center roof section of the roof extends along the cross member.

7. Body according to claim 6, wherein the individual rollover bars, the cross member and vehicle body walls bound openings, into which viewing panes are inserted.

8. Body according to claim 6, wherein the individual rollover bars and the cross member consist of a high-strength material.

9. Body according to claim 8, wherein the high strength material is a carbon-fiber-reinforced plastic material.

10. Body according to claim 8, wherein the individual rollover bars and the cross member are integrated into a vehicle body structure which consists of a high-strength material.

11. Body according to claim 10, wherein the high strength material is a carbon-fiber-reinforced plastic material.

12. Body according to claim 1, wherein the roof includes two roof elements fitted together in a longitudinal center plane of the passenger car.

13. Body according to claim 12, wherein each roof element consists of a high-strength material.

14. Body according to claim 13, wherein the high strength material is a glass-fiber-reinforced plastic material.

15. A body for a motor vehicle having a windshield frame, and rollover bar system, comprising:

a removable roof which covers an area between the windshield frame and the rollover bar system, wherein the roof is dimensionally stable,
    a front edge of the roof follows a contour of the windshield frame,
    a rear edge of the roof follows a contour of the rollover bar system,
    wherein the rollover bar system contour includes convexly shaped sections and a concavely shaped section, and
    at least a rear portion of the roof has two lateral roof sections and a center indented roof section extending between the lateral roof sections.

16. The body of claim 15, wherein the lateral roof sections are curved, and the center roof section is a plane.

17. The body of claims 16, wherein visible contour lines extending in the longitudinal direction of the vehicle are provided between the lateral roof sections and the center roof section.

18. The body of claim 15, wherein the indentation of the center roof section increases continuously between the windshield frame and the rollover bar system.

19. The body of claim 16, wherein the indentation of the center roof section increases continuously between the windshield frame and the rollover bar system.

20. The body of claim 15, wherein the rollover bar system has two individual rollover bars which are spaced in the transverse direction of the vehicle and have upright legs, the upright legs of the individual rollover bars are supported by a cross member, and the center roof section extends along the cross member.

21. The body of claim 20, wherein the individual rollover bars are located over at least one vehicle body wall, further comprising:

viewing panes located within openings defined by the individual rollover bars, the cross member and the at least one vehicle body wall.

22. The body of claim 20, wherein wherein the individual rollover bars and the cross member are formed from a high-strength material.

23. The body of claim 21, wherein the high-strength material is a carbon-fiber-reinforced plastic material.

24. The body of claim 21, wherein the individual rollover bars and the cross member are integrated into a vehicle body structure formed from a high-strength material.

25. The body of claim 24, wherein the high-strength material is a carbon-fiber-reinforced plastic material.

26. The body of claim 15, wherein the roof includes two roof elements fitted together in a longitudinal center plane of the motor vehicle.

27. The body of claim 26, wherein each roof element is formed from a high-strength material.

28. The body of claim 27, wherein the high strength material is a glass-fiber-reinforced plastic material.

* * * * *